United States Patent [19]
Yankaitis

[11] 3,789,534
[45] Feb. 5, 1974

[54] ELECTRICAL ATTACHMENT FOR A FISHING ROD

[76] Inventor: Thomas J. Yankaitis, 1223 Harlem Blvd., Rockford, Ill. 61103

[22] Filed: Feb. 16, 1973

[21] Appl. No.: 333,197

[52] U.S. Cl. ................................................ 43/19.2
[51] Int. Cl. ............................................ A01k 87/00
[58] Field of Search ...................... 43/19.2, 26.1, 24

[56] References Cited
UNITED STATES PATENTS

| | | | |
|---|---|---|---|
| 2,746,198 | 5/1956 | Smith | 43/19.2 |
| 2,758,407 | 8/1956 | Speidell | 43/19.2 |
| 3,031,790 | 5/1962 | Duryea | 43/19.2 |

*Primary Examiner*—Warner H. Camp
*Attorney, Agent, or Firm*—Morsbach, Pillote & Muir

[57] ABSTRACT

A DC motor is mounted on a fishing rod for selectively driving a reciprocating arm which operates in a plane perpendicular to the fishline. The motor and a battery are contained in a housing which is clamped onto the fishing rod at a point adjacent the handle so that a switch can be easily manipulated by the handle-gripping hand of the fisherman. The reciprocating arm passes through a pivotally mounted connecting block which allows the arm to reciprocate therethrough. The reciprocating arm terminates in an eye circumjacent the fishline and this eye is moved in an ovoid path to vibrate the fishline.

10 Claims, 4 Drawing Figures

Patented Feb. 5, 1974
3,789,534
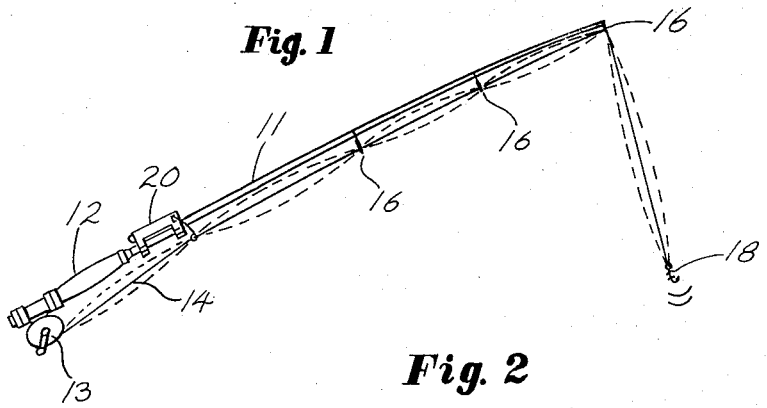
Fig. 1
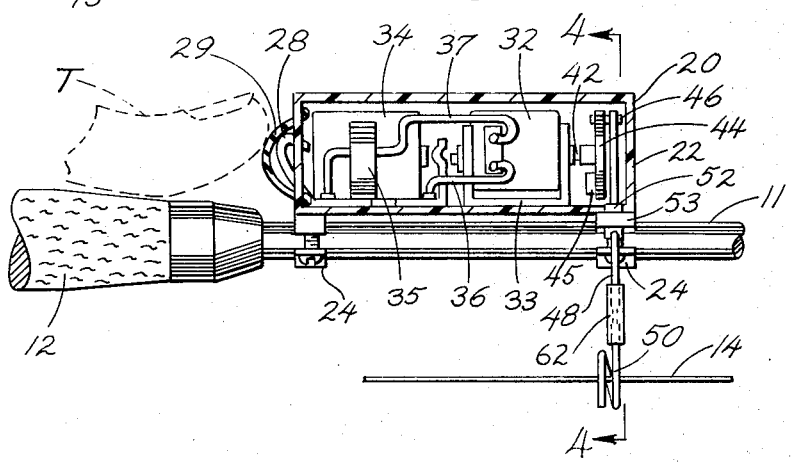
Fig. 2
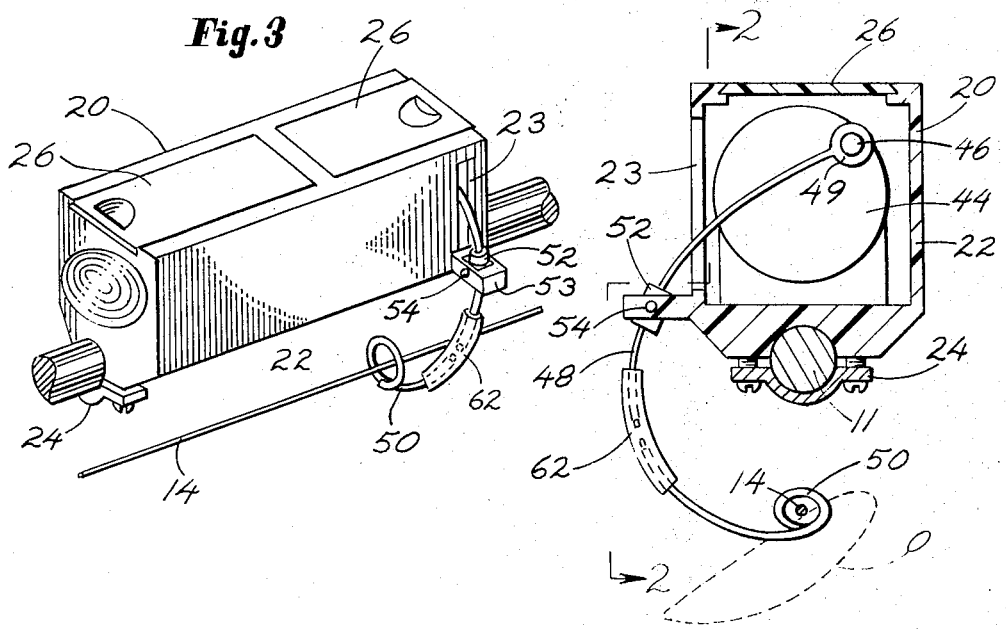
Fig. 3
Fig. 4

ELECTRICAL ATTACHMENT FOR A FISHING ROD

BACKGROUND

The invention pertains generally to the art of fishing, and more particularly to fishing rods having non-reeling motion means for the fishline.

In the prior art there is apparatus for automatically moving the fishing rod up and down; as shown for example in U. S. Pat. No. 3,001,317 issued Sept. 26, 1961 to N. E. Boughton. Solenoid-operated apparatus has been utilized to exert a longitudinal jerk on the fishline; as shown in U. S. Pat. No. 2,908,103 issued Oct. 13, 1959 to R. H. Mertz. U. S. Pat. No. 2,861,378 issued Nov. 25, 1958, to B. T. Bell discloses a battery-operated motor which exerts a similar longitudinal jerk to the fishline. Some of these prior art mechanisms are quite cumbersome, while others require a rather positive connection to the fishing line. In mechanisms of this general nature, it is preferable that they be compact and that the connection to the fishing line be such that it does not interfere with paying the line out or reeling it in.

It is a general object of this invention to provide a simple and effective mechanism for producing the above-mentioned desired results.

Another object of the present invention is to provide an electrical attachment for a fishing rod for automatically vibrating a fishline so as to move the fish hook in a manner to attract the attention of surrounding fish.

It is an object of the present invention to provide an electrical attachment for a fishing rod in accordance with the foregoing object and so constructed and arranged so as not to interfere with maneuvering the fishline.

A further object of the invention is to provide a mechanism of the class described which is inexpensive to manufacture, simple to use, which operates on a readily available DC battery, and which operates over a long period of time without changing the battery therein.

These, and other objects and advantages of the present invention, will become apparent as the same becomes better understood from the following detailed description when taken in conjunction with the accompanying drawings.

DRAWINGS

FIG. 1 is an elevational view of one embodiment of the present invention;

FIG. 2 is a longitudinal section taken generally along broken line 2—2 of FIG. 4;

FIG. 3 is a perspective view of an embodiment of the electrical attachment shown mounted on a fishing rod; and FIG. 4 is a cross-sectional view taken generally along line 4—4 of FIG. 2.

DESCRIPTION

Reference is now made more particularly to the drawings which illustrate the best presently known mode of carrying out the invention and wherein similar reference characters indicate the same parts throughout the several views.

In the drawing there is shown a conventional fishing rod 11 having a handle 12 and a conventional fishing reel 13 at one end thereof. A fishing line 14 is wound on reel 13 and is threaded through eyes 16 to a fishhook 18.

Mounted on the rod 11 is an electrical attachment, generally designated 20, for vibrating the fishing line 14 and hence the hook 18 or other lure. The attachment 20 includes a generally rectangular housing 22 detachably mounted on the rod 11 by means of clamps 24. At the top of the housing are provided slidable closures 26 which may be selectively removed to provide access into the housing. At the rear of the housing is a switch 28 advantageously covered by a flexible covering 29 which, in the preferred embodiment, is formed of rubber to protect the switch from the elements. The location of the switch and covering is preferably adjacent the handle 12 so that a fisherman may hold the fishing rod by grasping the handle and may at the same time operate the switch 28 by means of his thumb shown at T in FIG. 2. Alternatively, the housing 22 may be mounted farther out on the rod 11 and the switch 28 may be a remote switch separately mounted adjacent the handle 12. This alternate arrangement may be used with spinning reels, for example.

Inside the housing 22 is a small DC electric motor 32 rigidly mounted on bracket 33 and a battery 34, for example a D cell battery, is removably mounted in a clamp 35. Wires 36 and 37 provide a circuit which includes the motor 32 and battery 34, with the switch 28 attached to wire 37. Thus it can be seen that the thumb T can close the switch 28 to selectively provide current to the motor 32.

The motor 32 has an output shaft 42 which has a crank secured thereto. In the embodiment shown, the crank comprises a fly wheel 44 having a counterweight 45 and an eccentric 46 thereon. A reciprocating arm 48 is operatively connected to the eccentric 46 to convert the rotary motion of the motor into a reciprocating type motion. The reciprocating arm 48 advantageously lies in a plane perpendicular to the crank and line 14. Arm 48 passes laterally outwardly through an opening 23 at the front of the housing and through a connecting block 52 which is pivotally mounted on a laterally extending arm 53 by means of pin 54. The connecting block 52 has an opening therethrough for passage of the reciprocating arm 48 and the clearance is such as to allow the reciprocating arm to move freely through the connecting block.

In the preferred embodiment illustrated, the reciprocating arm 48 has one end 49 which is circumjacent the eccentric 46. At the other end of the reciprocating arm is an eye 50 which surrounds the fishline 14 in spaced relation. The preferred shape of the reciprocating arm 48 is best illustrated in FIG. 4 and comprises an arcuate loop which arcs outwardly through the connecting block 52 and then inwardly to a position directly beneath the rod 11. Rotation of the fly wheel 44 causes the arm to reciprocate and slide through the connecting block 52. The change in position of the eccentric 46 causes a slight tilting of the connecting block and moves the eye 50 in a generally ovoid shape as shown in 0 in FIG. 4. As can be seen in FIGS. 2–4, the eye 50 is formed by a loop at the outer end of the reciprocating arm 48. The loop has overlapping portions to provide a closed loop when viewed in a direction parallel to the line 14. The overlapping portions are spaced enough to provide ready insertion of the line 14 into the loop.

The reciprocating arm 48 may have upper and lower portions which are interconnected by a sleeve 62. The two portions may be slidably adjusted in the sleeve to change the position of the eye 50 if desired.

From the foregoing description it can be seen that operation of the motor 32 through the connecting mechanism causes reciprocation of arm 48 to move the outer end of the same in a direction crosswise of the line 14. The outer end of the reciprocating rod is in the form of a loop circumjacent the line so that movement of the loop vibrates the line. It can be seen that each revolution of the motor creates two pulls on the fishline. Additionally, the pulls on the fishline are limited in the magnitude of the longitudinal pull on the line so that the effect at the hook 18 is that of repeated vibrations or quivers of extremely short duration.

While a preferred embodiment of the invention has herein been illustrated and described, this has been done by way of illustration and not limitation, and the invention should not be limited except as required by the scope of the appended claims.

The embodiments of the invention in which an exclusive property or privilege is claimed are defined as follows:

1. In a fishing device including a rod; a line supported on the rod, and a hook connected to the line, the improvement comprising: an electrical attachment mounted on and supported by the pole for providing a vibration to the line and including a housing; means for mounting the housing on the rod; an electrical motor in the housing; means for selectively supplying current to the motor; a crank rotatably driven by the motor; and a reciprocating arm arranged in a plane generally perpendicular to both the crank and the line; said arm being pivotally attached to the crank and engaged with the line so that rotation of the crank reciprocates the arm in a direction crosswise of the line and vibrates the same.

2. The combination of claim 1 including a connecting block mounted on the housing at a position laterally spaced from the rod for pivotal movement about an axis perpendicular to said plane; and the connecting block having an opening in which the reciprocating arm is slidably received; whereby the reciprocating arm slides back and forth through the connecting block when operated on by the crank and the connecting block pivots about said axis during such operation to produce an ovoid curve at the outer extremity of the reciprocating arm.

3. The combination of claim 2 wherein the crank is located on the side of the rod opposite the line; the reciprocating arm is arcuate, and curves from the crank outwardly through the block and inwardly to an outer extremity adjacent the line; and the outer extremity is in the form of an eye through which the line freely passes.

4. The combination of claim 3 in which the eye is formed by a loop at the end of the reciprocating arm, said loop having overlapping portions to provide a closed loop when viewed in a direction perpendicular to said plane, yet spaced apart in said direction to provide ready insertion of the line into the loop.

5. The combination of claim 4 wherein said means for selectively supplying current to the motor includes: a battery in the housing; a normally-open switch mounted on the housing and positioned for finger manipulation by the hand of a fisherman while gripping the rod.

6. In a fishing apparatus including a fishing rod, a fishline supported on the rod and adapted to travel therealong when payed out or reeled in, and a lure connected to the line, the improvement comprising: a DC motor; means including a battery for supplying current to the motor; means for mounting the motor and battery on the rod at the side opposite the fishline; a reciprocating arm engaged with the fishline and extending therefrom in a curved path past the rod to a point adjacent the motor; said arm lying in a plane generally perpendicular to the fishline; and apparatus engaged with the reciprocating arm and motor for converting the circular movement of the motor to oscillating movement of the arm.

7. A fishing apparatus as set forth in claim 6 in which the reciprocating arm has an eye circumjacent the fishline.

8. A fishing apparatus as set forth in claim 6 in which the first-mentioned means includes a normally-open switch positioned for finger manipulation by the hand of a fisherman gripping the fishing rod.

9. A fishing apparatus as set forth in claim 6 including means supported on the rod and engaging the reciprocating arm intermediate the ends thereof.

10. A fishing apparatus as set forth in claim 9 wherein the means engaging the reciprocating arm intermediate the ends thereof includes: a connecting block mounted for pivotal movement about an axis perpendicular to said plane; the connecting block having an opening therethrough and in which the reciprocating arm is slidably received; and whereby the reciprocating arm slides back and forth through the connecting block when the motor is operated and the connecting block rocks about said axis during such operation to produce an ovoid curve at the extremity engaged with the fishline.

* * * * *